United States Patent
Nishimori et al.

(10) Patent No.: US 7,215,599 B2
(45) Date of Patent: May 8, 2007

(54) ULTRASONIC TRANSMITTER, ULTRASONIC TRANSCEIVER AND SONAR APPARATUS

(75) Inventors: Yasushi Nishimori, Nishinomiya (JP); Minoru Handa, Nishinomiya (JP); Shiroh Ozasa, Nishinomiya (JP); Masaru Nishida, Nishinomiya (JP); Hiromune Matsumoto, Nishinomiya (JP)

(73) Assignee: Furuno Electric Co., Ltd., Hyogo-ken (JP)

( * ) Notice: Subject to any disclaimer, the term of this patent is extended or adjusted under 35 U.S.C. 154(b) by 0 days.

(21) Appl. No.: 10/720,226

(22) Filed: Nov. 25, 2003

(65) Prior Publication Data
US 2004/0184351 A1    Sep. 23, 2004

(30) Foreign Application Priority Data
Nov. 27, 2002    (JP)    ............... 2002-343913

(51) Int. Cl.
*H04B 1/02*    (2006.01)
*H04B 1/38*    (2006.01)
*A61B 8/00*    (2006.01)

(52) U.S. Cl. .................... 367/138; 367/137; 600/447

(58) Field of Classification Search ................ 367/103, 367/137, 138; 600/447
See application file for complete search history.

(56) References Cited

U.S. PATENT DOCUMENTS

| | | | |
|---|---|---|---|
| 4,271,705 A | 6/1981 | Crostack | |
| 5,833,614 A | 11/1998 | Dodd et al. | |
| 6,117,082 A * | 9/2000 | Bradley et al. | 600/447 |
| 6,123,671 A * | 9/2000 | Miller | 600/447 |
| 6,157,593 A | 12/2000 | Costa et al. | |
| 6,226,228 B1 * | 5/2001 | Hossack et al. | 367/138 |
| 6,243,323 B1 | 6/2001 | Li | |
| 6,363,033 B1 * | 3/2002 | Cole et al. | 367/138 |
| 2003/0236461 A1 * | 12/2003 | Poland | 600/443 |

* cited by examiner

*Primary Examiner*—Ian J. Lobo
(74) *Attorney, Agent, or Firm*—Birch, Stewart, Kolasch & Birch, LLP (57) ABSTRACT

An ultrasonic transmitter generates a reference signal based on a clock signal of a specific frequency and a control signal made up of binary values 0 and 1 for controlling how the level (High or Low) of a carrier drive signal should change, and generates an analog signal constituting the carrier drive signal by pulse-duration-modulating the reference signal. Produced from the carrier drive signal, a driving pulse signal is shaped into a curved waveform having a gradually rising leading edge and a gradually falling trailing edge as the amplitude of the carrier drive signal is gradually increased and decreased based on the control signal.

11 Claims, 12 Drawing Sheets

|  | ADRS (Hex) | MSB | | | | | | LSB |
|---|---|---|---|---|---|---|---|---|
| Weight#0 { | 00000 | T15 | T14 | - - - - - - | | T2 | T1 | T0 |
| | 00001 | T31 | T30 | - - - - - - | | T18 | T17 | T16 |
| | ⋮ | | | ⋮ | | | ⋮ | |
| | 01FFF | T131071 | T131070 | - - - - - - | | T131058 | T131057 | T131056 |
| Weight#1 { | 02000 | T15 | T14 | - - - - - - | | T2 | T1 | T0 |
| | 02001 | T31 | T30 | - - - - - - | | T18 | T17 | T16 |
| | ⋮ | | | ⋮ | | | ⋮ | |
| | 03FFF | T131071 | T131070 | - - - - - - | | T131058 | T131057 | T131056 |
| | | | | ⋮ | | | ⋮ | |
| Weight#7 { | 0E000 | T15 | T14 | - - - - - - | | T2 | T1 | T0 |
| | 0E001 | T31 | T30 | - - - - - - | | T18 | T17 | T16 |
| | ⋮ | | | ⋮ | | | ⋮ | |
| | 0FFFF | T131071 | T131070 | - - - - - - | | T131058 | T131057 | T131056 |

FIG. 4

FIG. 5A
CLOCK SIGNAL

T: PERIOD

FIG. 5B
CONTROL SIGNAL

FIG. 5C
PULSE DRIVE 1H
SIGNAL

FIG. 5D
PULSE DRIVE 2H
SIGNAL

FIG. 5E
REFERENCE
SIGNAL

FIG. 5E'
REFERENCE
SIGNAL

FIG. 5F
CARRIER DRIVE
SIGNAL
DRIVING PULSE
SIGNAL

CARRIER DRIVE SIGNAL
DRIVING PULSE SIGNAL

----- DRIVING PULSE SIGNAL
——— CARRIER DRIVE SIGNAL

ULTRASONIC TRANSMITTER, ULTRASONIC TRANSCEIVER AND SONAR APPARATUS

This Nonprovisional application claims priority under 35 U.S.C. § 119(a) on Patent Application No. 2002-343913 filed in JAPAN on Nov. 27, 2002, the entire contents of which are hereby incorporated by reference.

BACKGROUND OF THE INVENTION

1. Field of the Invention

The present invention relates to an ultrasonic transmitter for radiating ultrasonic waves into a body of water, for instance, an ultrasonic transceiver for radiating ultrasonic waves and receiving echoes of the radiated ultrasonic waves, and a sonar apparatus including an ultrasonic transceiver for detecting objects using ultrasonic waves.

2. Description of the Related Art

Today, sonar apparatuses, such as scanning sonars, are widely used for detecting underwater objects. A scanning sonar for detecting underwater objects all around has a generally cylindrical transducer. The scanning sonar forms an ultrasonic transmitting beam oriented in all directions around the transducer by activating transducer elements arranged on a cylindrical surface of the transducer. Also, the scanning sonar forms a receiving beam oriented in a particular horizontal direction using a specific number of vertically arranged sets, or columns, of transducer elements centered on that horizontal direction. Typically, this receiving beam is rotated around the transducer to detect underwater objects in a full-circle area by successively switching the columns of transducer elements.

Figure 13:
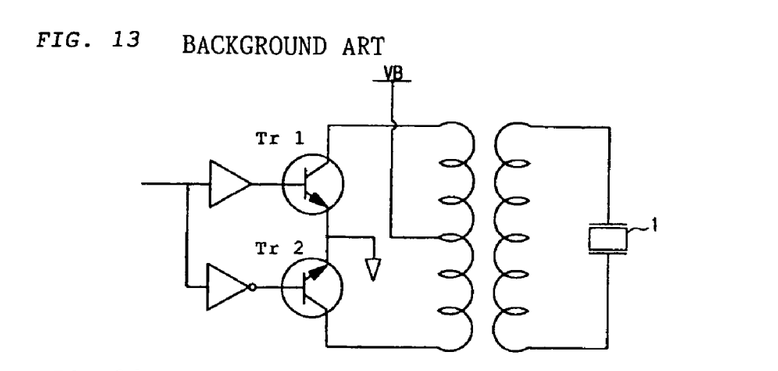
FIG. 13 is an equivalent circuit generally showing the configuration of a switching-type driving pulse signal generator circuit.
Figure 14:
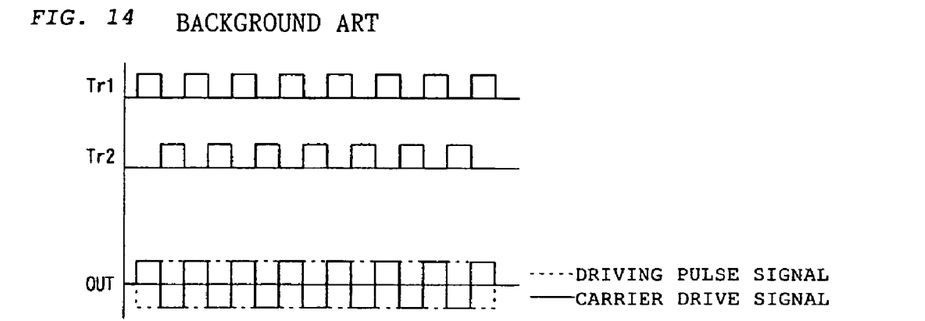
FIG. 14 is a time chart showing signal states in the driving pulse signal generator circuit of FIG. 13.

This kind of scanning sonar includes an ultrasonic transceiver which employs a switching-type or linear-type push-pull circuit including a transformer as a circuit for generating a driving pulse signal for activating the transducer elements. Shown in FIG. 13 is an example of a driving pulse signal generator circuit employing a switching-type circuit configuration for generating a driving pulse signal as shown in FIG. 14. Shown in FIG. 15 is an example of a driving pulse signal generator circuit employing a linear-type circuit configuration for generating a driving pulse signal.

FIG. 13 is an equivalent circuit generally showing the configuration of the switching-type driving pulse signal generator circuit, in which designated by the numeral 1 is a transducer element, designated by Tr1 and Tr2 are transistors, and designated by VB is a driving voltage of the driving pulse signal generator circuit. FIG. 14 is a time chart showing signal states in the driving pulse signal generator circuit of FIG. 13.

Figure 15:
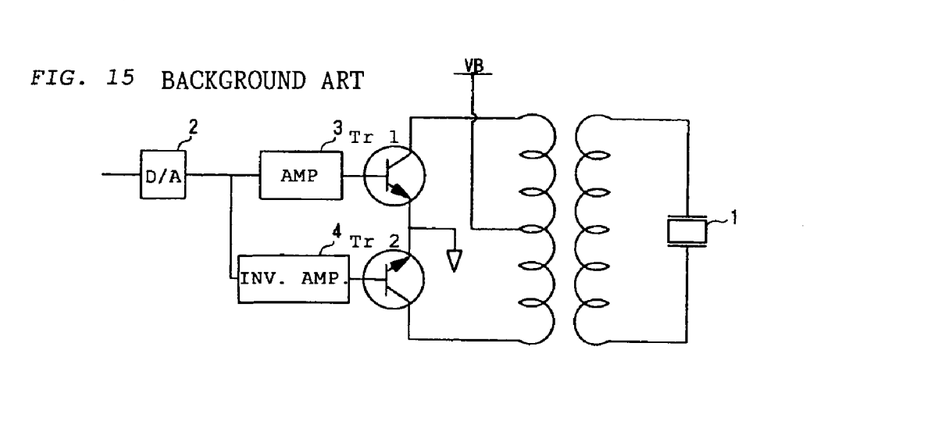
FIG. 15 is an equivalent circuit generally showing the configuration of a linear-type driving pulse signal generator circuit.

FIG. 15 is an equivalent circuit generally showing the configuration of the linear-type driving pulse signal generator circuit, in which designated by the numeral 1 is a transducer element, designated by the numeral 2 is a digital-to-analog (D/A) converter, designated by the numeral 3 is an amplifier, designated by the numeral 4 is an inverting amplifier, designated by Tr1 and Tr2 are transistors, and designated by VB is a driving voltage of the driving pulse signal generator circuit.

In the switching-type driving pulse signal generator circuit shown in FIG. 13, rectangular pulse signals of opposite polarities (180° shifted in phase) of a specific frequency are input into the transistors Tr1, Tr2. As the transistors Tr1, Tr2 are alternately switched on and off by the input rectangular pulse signals with specific timing, the driving pulse signal generator outputs a driving pulse signal of which waveform is shown by broken lines in FIG. 14, and this driving pulse signal is applied to the transducer element 1 across both terminals thereof. A prior art example of this kind of switching-type driving pulse signal generator circuit is described in Japanese Patent Application No. 2001-401798, for instance.

In the linear-type driving pulse signal generator circuit shown in FIG. 15, the D/A converter 2 converts an input rectangular pulse signal into an analog signal and delivers this analog signal to the amplifier 3 and the inverting amplifier 4. The amplifier 3 amplifies the input analog signal while the inverting amplifier 4 amplifies the input analog signal with a 180° phase shift (opposite polarity). As the two analog signals of opposite polarities (180° shifted in phase) are input into the transistors Tr1, Tr2, the two transistors Tr1, Tr2 are alternately switched on and off with specific timing to produce a driving pulse signal of a desired waveform, which is applied to the transducer element 1 across both terminals thereof.

The ultrasonic transceiver of the conventional scanning sonar has a pending problem to be solved as will be explained below.

Since the aforementioned switching-type driving pulse signal generator circuit produces the driving pulse signal from rectangular pulse signals of a fixed waveform, the resultant driving pulse signal also has a rectangular waveform as shown in FIG. 14.

Figure 16A:
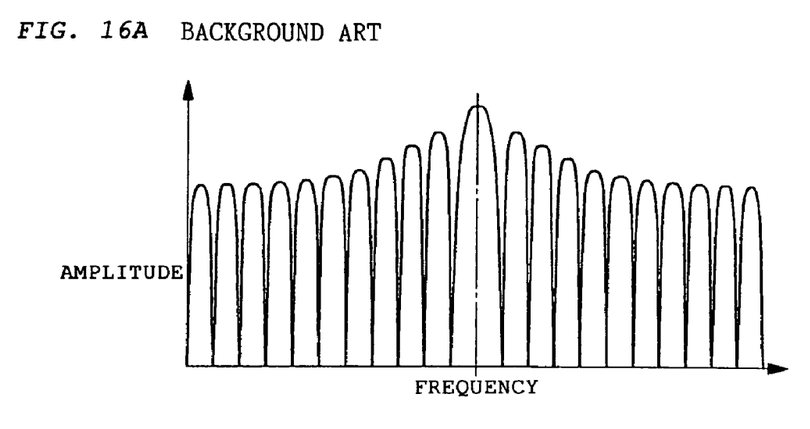
FIGS. 16A and 16B are diagrams showing frequency spectra of ultrasonic signals produced by using driving pulse signals having a rectangular waveform.
Figure 16B:
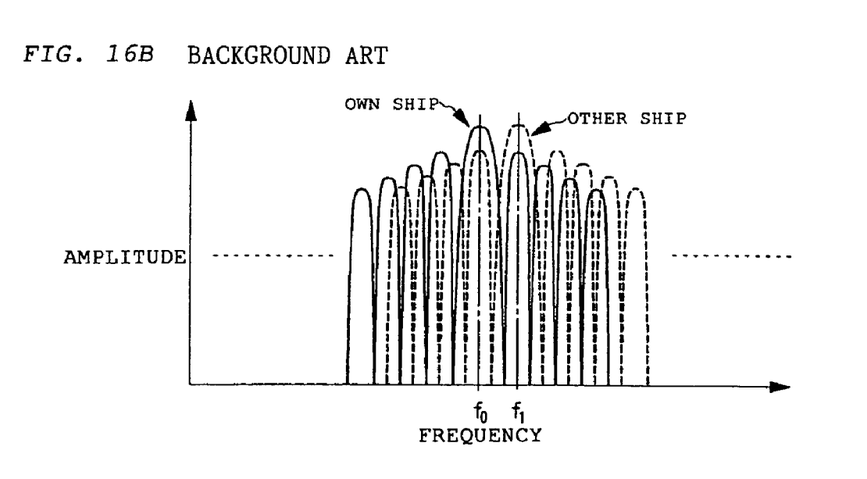

If a transducer element is driven by the driving pulse signal having a rectangular envelope as shown in FIG. 14, an ultrasonic wave radiated from the transducer element contains not only a desired transmitting frequency component fo which is predefined but also undesired frequency components of high amplitude levels as shown in FIG. 16A.

If a scanning sonar installed on own ship transmits ultrasonic waves underwater from a transducer of which transducer elements are driven by driving pulse signals having a rectangular envelope as stated above, the transducer radiates not only the desired frequency component fo but also the undesired frequency components. On the other hand, if another ship near own ship is fitted with her own sonar apparatus which transmits and receives ultrasonic waves at a frequency f1 which is different from but relatively close to the transmitting frequency fo of the own ship's scanning sonar, the sonar apparatus on the nearby ship receives at least part of the undesired frequency components radiated from the own ship's scanning sonar. Since echo signals received by the sonar apparatus on the nearby ship are affected by the undesired frequency components radiated from the own ship's scanning sonar, the sonar apparatus on the nearby ship would present interference fringes or false images.

Figure 17:
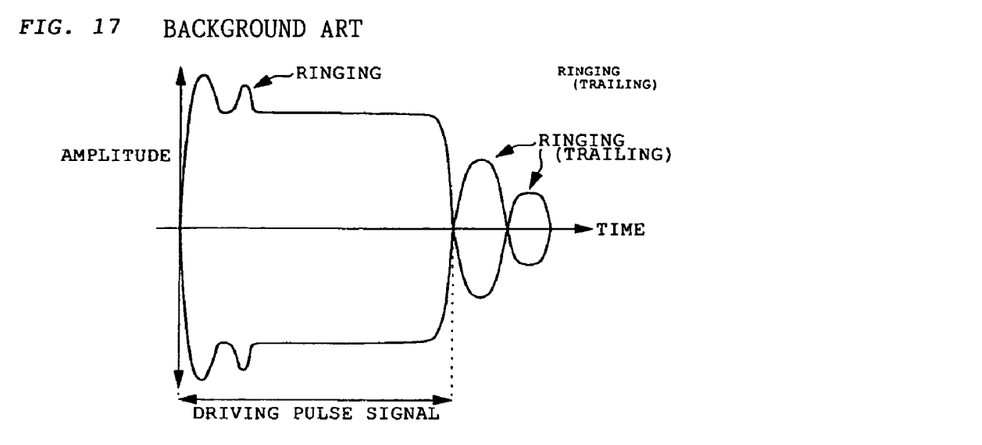
FIG. 17 is a diagram showing an ultrasonic transmitting signal produced from a rectangular-shaped driving pulse signal.

It is necessary to match the transducer with a transmitting beamforming circuit in impedance to transfer the driving pulse signal to the transducer with small transmission loss, and this requires a matching circuit to be inserted between the transducer and the transmitting beamforming circuit. However, frequency response (transfer function) of this kind of matching circuit often contains components (spurious) responsive to frequencies other than a center frequency. If the driving pulse signal having a rectangular envelope is transferred through this matching circuit, the spurious components of the transfer function will be superimposed on the driving pulse signal. These spurious components cause a damped oscillatory transient known as "ringing" immediately following a trailing edge of the envelope of the driving pulse signal, where a sudden change in signal level occurs, as shown in FIG. 17. When such a ringing phenomenon occurs, a single underwater object (or target) will return multiple target echoes, causing the sonar to detect false targets. In addition, the oscillatory transient caused by the ringing phenomenon following the rectangular-shaped driving pulse signal overlaps echo signals received immediately after transmission of a rectangular-shaped ultrasonic pulse signal, making it impossible to receive echoes from nearby targets, such as bottom echoes in shallow areas.

To overcome this problem, it is generally needed to reshape the rectangular-shaped driving pulse signal such that it has a gradually rising leading edge as well as a gradually falling trailing edge. It is however impossible to control the envelope shape of the driving pulse signal such that its amplitude varies gradually by the aforementioned conventional switching-type circuit configuration which produces the driving pulse signal from rectangular pulse signals of a fixed waveform. Thus, the conventional switching-type circuit configuration is associated with a problem that it can not produce a driving pulse signal of a desired waveform.

In order to control directivity of ultrasonic waves transmitted from the transducer, it is necessary to set spatial weights of the ultrasonic waves emitted from individual transducer elements. In other words, particular weights should be assigned to the amplitude of the ultrasonic waves emitted from the individual transducer elements arranged on the transducer to produce desired transmitting directivity. Again, it is impossible to vary the amplitude of the ultrasonic waves with the conventional switching-type circuit configuration which produces the driving pulse signal from rectangular pulse signals of a fixed waveform, unless the amplitude of a power supply voltage waveform is varied. Although a variable voltage power supply circuit can produce a power supply voltage waveform of a varying amplitude, the variable voltage power supply circuit uses a capacitor of a large capacity which requires a long time for charging and discharging. It is therefore impracticable to use a variable voltage power supply circuit for driving the transducer of which transducer elements must be switched at a high speed.

In contrast, the aforementioned linear-type driving pulse signal generator circuit makes it possible to shape the waveform of the driving pulse signal and vary its amplitude in an arbitrary fashion. However, it is necessary to provide D/A converters for the individual transducer elements in the linear-type circuit configuration and this results in large power consumption. Also, the linear-type circuit configuration necessitates a large number of components, resulting in an increase in overall equipment size. Furthermore, since the transistors Tr1, Tr2 are operated in their non-saturation area, there occurs a large loss, making it impossible to achieve high efficiency.

SUMMARY OF THE INVENTION

It is an object of the invention to provide a compact, low-loss ultrasonic transmitter which makes it possible to suppress the occurrence of undesired transmitting frequency components by controllably shaping driving pulse signals for driving transducer elements of a transducer into a desired waveform (envelope shape) and to instantly set up desired spatial weights to be assigned to ultrasonic waves emitted from the individual transducer elements through a pulse-duration modulation process. It is a further object of the invention to provide an ultrasonic transceiver and a sonar apparatus including such an ultrasonic transmitter.

According to the invention, an ultrasonic transmitter includes a transducer having a plurality of transducer elements arranged on a surface of the transducer, and a transmitting beamformer for forming an ultrasonic transmitting beam by driving the multiple transducer elements with a driving pulse signal. The transmitting beamformer of this ultrasonic transmitter is characterized by including a driving pulse signal generator for generating a carrier drive signal through a pulse-duration modulation (PDM) process and the driving pulse signal while controlling its amplitude and envelope based on the carrier drive signal.

Figure 18A:
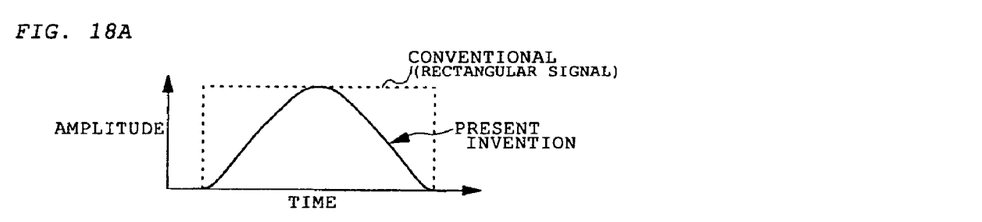
FIGS. 18A and 18B are a diagram showing a waveform of a driving pulse signal of which envelope is controllably shaped according to the invention and a frequency spectrum of the driving pulse signal.
Figure 18B:
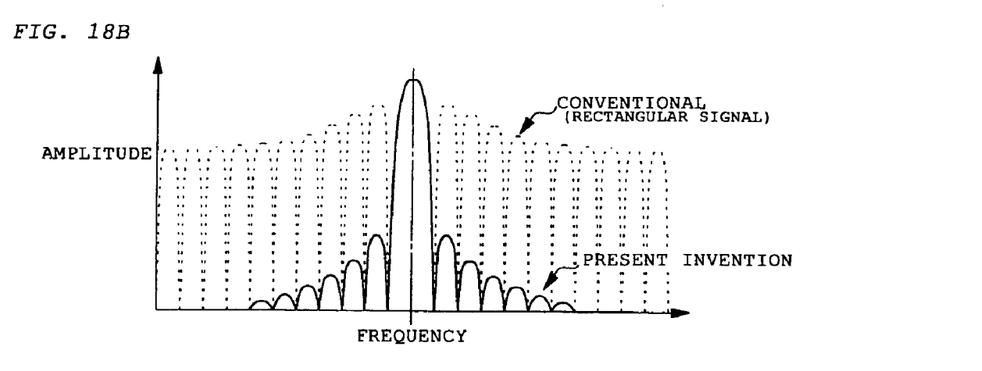

In the ultrasonic transmitter thus structured, the driving pulse signal generator shapes the envelope of the carrier drive signal in a controlled fashion as shown in FIG. 18A by pulse-duration-modulating a reference signal from which the driving pulse signal fed into each of the transducer elements is produced. It is possible to suppress undesired frequency components radiated from the transducer without losing desired frequency components as shown in FIG. 18B by controlling the envelope shape (waveform) of each pulse of the driving pulse signal as shown in FIG. 18A. This serves to prevent interference between ultrasonic signals transmitted at close frequencies from two sonar systems installed on nearby ships.

In one feature of the invention, the driving pulse signal generator includes a control signal generator for generating a rectangular pulse signal (pulse signal) of a specific frequency and a control signal for controlling the waveform of a reference signal on which the pulse-duration modulation process is performed, and a carrier drive signal generator for generating the carrier drive signal by pulse-duration-modulating the reference signal based on the rectangular pulse signal and the control signal.

In the ultrasonic transmitter thus structured, the reference signal is generated using the rectangular pulse signal of a fixed pulse repetition period and the control signal specifying points of level changes in the reference signal at the timing of each level change in the rectangular pulse signal as shown in FIGS. 5A through 5F. The carrier drive signal and the driving pulse signal formed of the carrier drive signal are finally obtained by passing the reference signal thus generated through a matching circuit.

In another feature of the invention, the control signal generated by the driving pulse signal generator is a signal made up of binary values 0 and 1.

In the ultrasonic transmitter thus structured, it is possible to generate the control signal from a simple signal containing only the binary values 0 and 1.

In still another feature of the invention, the transmitting beamformer controls directivity of the transmitting beam by varying the amplitude of the driving pulse signal for driving each of the multiple transducer elements and the amount of time delay introduced into the driving pulse signal based on weight data and time delay data previously stored in the driving pulse signal generator.

In the ultrasonic transmitter thus structured, the driving pulse signal for driving each of the multiple transducer elements is produced through the aforementioned pulse-duration modulation process in such a manner that the driving pulse signals fed into the individual transducer elements have different amplitudes and different time delays. It is possible to form a transmitting beam having specific directivity by setting spatial weights and the amounts of time delay for the individual transducer elements of the transducer in this fashion.

In yet another feature of the invention, the carrier drive signals from which the driving pulse signals to be fed into the individual transducer elements are produced have different frequencies.

In the ultrasonic transmitter thus structured, it is possible to transmit the driving pulse signals formed of the carrier drive signals of different frequencies in multiple sounding directions and thereby form ultrasonic transmitting beams directed in the individual sounding directions using the different frequencies substantially at the same time, because the carrier drive signals from which the driving pulse signals to be fed into the individual transducer elements are produced have different frequencies.

According to the invention, an ultrasonic transceiver includes the aforementioned ultrasonic transmitter, and a receiving beamformer for forming an ultrasonic receiving beam by controlling signals produced by the multiple transducer elements of the transducer upon receiving echoes of the ultrasonic transmitting beam radiated by the ultrasonic transmitter.

The ultrasonic transceiver thus structured forms the ultrasonic receiving beam by radiating the ultrasonic transmitting beam underwater from the multiple transducer elements of the transducer during successive transmit cycles, receiving the echoes of the ultrasonic transmitting beam with the individual transducer elements during successive receive cycles, and controlling the signals produced by the individual transducer elements.

According to the invention, a sonar apparatus includes the aforementioned ultrasonic transceiver, and a device for controlling the receiving beamformer to scan successive sounding directions within the transmitting beam and pick up echo signals from the individual sounding directions and for displaying detected echo data obtained from the echo signals.

Overall, it is possible to suppress undesired transmitting frequency components radiated from the transducer while maintaining desired transmitting frequency components by generating the carrier drive signal by the PDM process and controllably shaping the envelope of the carrier drive signal, or the driving pulse signal, based on the carrier drive signal according to the present invention. This serves to prevent interference between ultrasonic signals transmitted at close frequencies from two sonar systems installed on nearby ships.

It is also possible to arbitrarily set spatial weights and the amounts of time delay of the ultrasonic signals radiated from the individual transducer elements of the transducer by controlling the amplitude of the driving pulse signal by the PDM process and controlling the amounts of time delay. This makes it possible to generate satisfactory ultrasonic transmitting signals in which the occurrence of side lobes and undesired frequency components are well suppressed at the same time.

Also, since the driving pulse signal is controllably shaped into a curved waveform having a gradually rising leading-edge portion and a gradually falling trailing-edge portion as shown in FIG. 18A, it is possible to prevent superimposition of the undesired frequency components in signal transmission and to transmit the driving pulse signal to each of the transducer elements with small transmission loss.

Furthermore, it is possible to achieve a reduction in equipment size as the driving pulse signal can be shaped into a desired waveform without using D/A converters.

According to the invention, it is possible to generate the reference signal using the rectangular pulse signal (clock signal) of a fixed pulse repetition period and the control signal specifying points of level changes in the reference signal at the timing of each level change in the rectangular pulse signal and produce the carrier drive signal having a desired waveform from the reference signal through the aforementioned PDM process. In addition, it is possible to generate the desired reference signal from a simple signal by configuring the control signal containing only the binary values 0 and 1. This makes it possible to produce the driving pulse signal having a desired waveform.

According to the invention, it is possible to form ultrasonic transmitting beams directed in multiple sounding directions substantially at the same time by using carrier drive signals of different frequencies to produce driving pulse signals for driving the individual transducer elements of the transducer.

These and other objects, features and advantages of the invention will become more apparent upon reading the following detailed description in conjunction with the accompanying drawings.

DETAILED DESCRIPTION OF THE PREFERRED EMBODIMENTS OF THE INVENTION

A scanning sonar including an ultrasonic transceiver according to a specific embodiment of the invention is now described with reference to the appended drawings.

Figure 1:
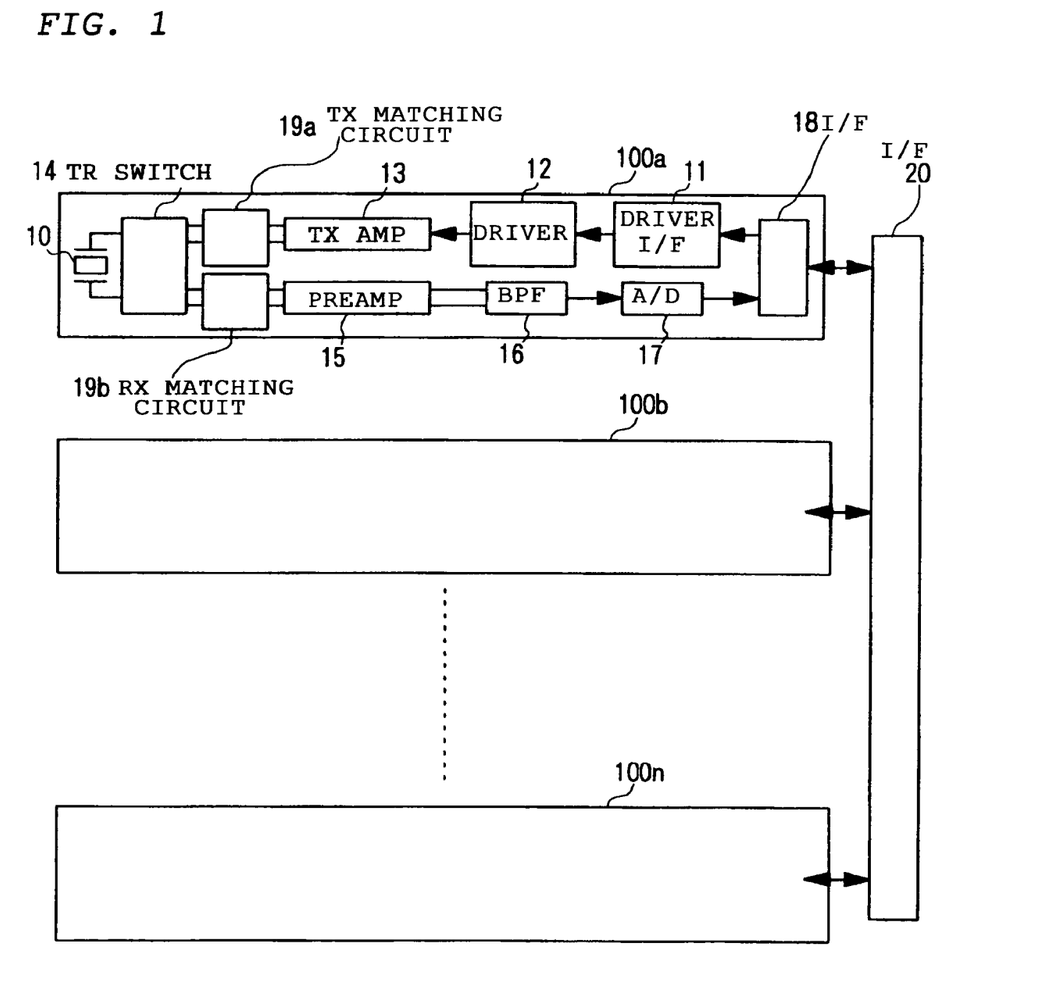
FIG. 1 is a block diagram showing a transmit-receive channel configuration of a scanning sonar according to a preferred embodiment of the invention.

FIG. 1 is a block diagram generally showing the configuration of transmit-receive channels 100 of the scanning sonar.

Referring to FIG. 1, each transmit-receive channel 100 includes a driver interface 11 which generates a pulse drive signal for producing a reference signal, which is converted into a carrier drive signal through a pulse-duration modulation (PDM) process, based on a clock signal, a control signal and driving code data supplied from a later-described programmable transmitting beamformer 26. The driver interface 11 is essentially a programmable logic device (PLD). A driver circuit 12 produces the reference signal from the pulse drive signal. A transmitting amplifier circuit 13 amplifies the reference signal and a transmit-receive switching circuit 14 produces the carrier drive signal (of which envelope is hereinafter referred to as a driving pulse signal) and supplies it to a transducer element 10 through a transmit-side matching circuit 19a. The transmit-receive switching circuit 14 passes an output signal of the transmitting amplifier circuit 13 fed through the transmit-side matching circuit 19a to the transducer element 10 during each successive transmit cycle and passes an echo signal received by the transducer element 10 to a preamplifier 15 through a receive-side matching circuit 19b during each successive receive cycle. The preamplifier 15 amplifies the received echo signal and a bandpass filter 16 in a succeeding stage removes noise components contained in the received echo signal existing outside the passband of the bandpass filter 16. An analog-to-digital (A/D) converter 17 samples the echo signal filtered by the bandpass filter 16 at specific sampling intervals and converts the sampled signals into a train of digital echo data.

The scanning sonar is provided with a plurality of such transmit-receive channels designated 100a, 100b, . . . , 100n as much as the number of the transducer elements 10 which are arranged on a surface of a transducer having a cylindrical or spherical shape, for instance.

Figure 2:
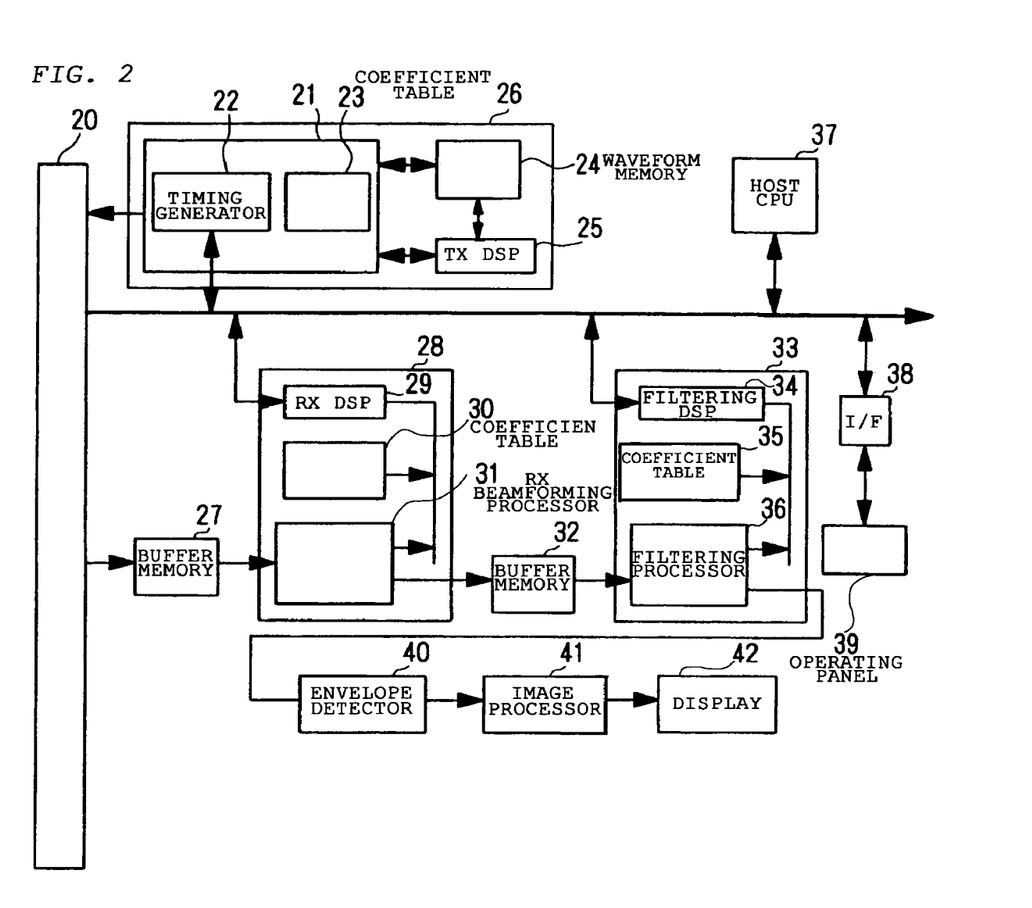
FIG. 2 is a block diagram of a control section for controlling multiple transmit-receive channels of the scanning sonar.

FIG. 2 is a block diagram of a control section for forming a transmitting beam and a receiving beam using the multiple transmit-receive channels 100 shown in FIG. 1 and generating a detected echo image derived from a particular search area. An interface 20 shown in FIG. 2 is the same as that shown in FIG. 1.

1. Transmitting System

Figure 3:
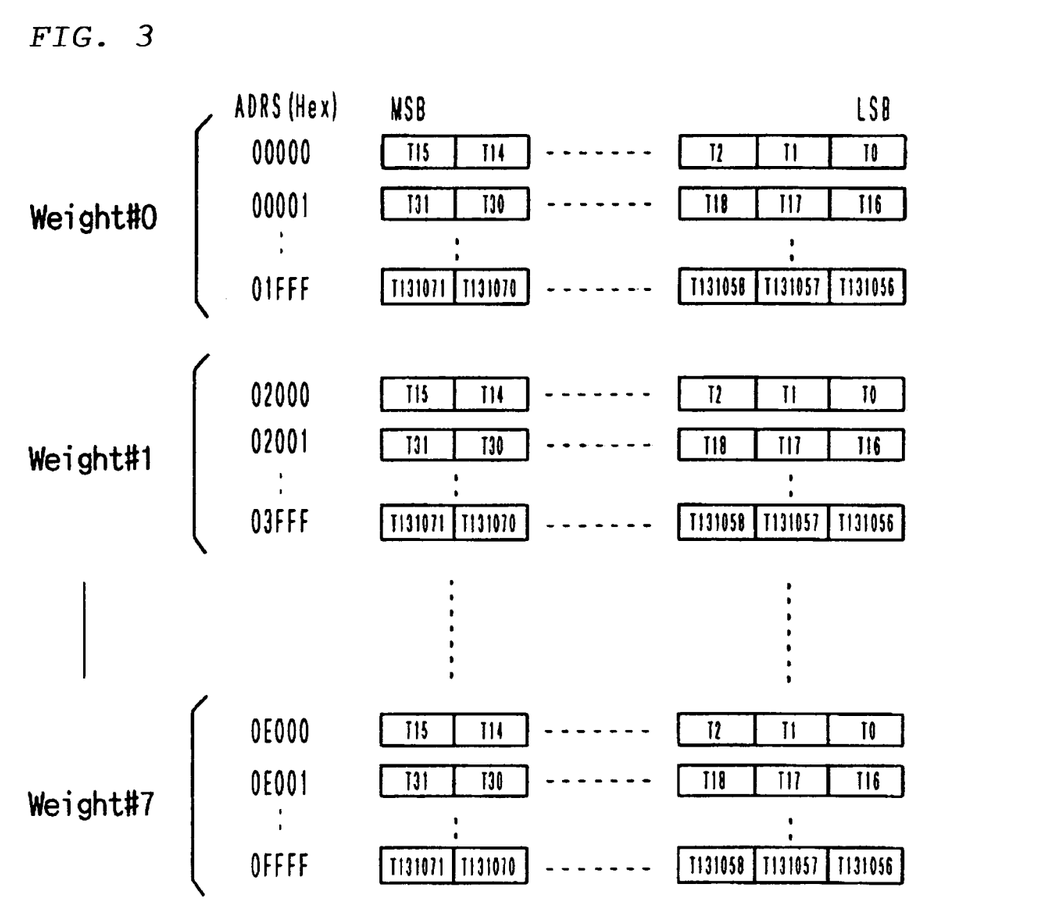
FIG. 3 is a conceptual diagram showing an example of data content of a memory map stored in a waveform memory.

Referring to FIG. 2, the programmable transmitting beamformer 26 includes a carrier drive signal generating circuit 21, a waveform memory 24 and a transmit digital signal processor (DSP) 25. The carrier drive signal generating circuit 21 incorporates a timing generator 22 and a coefficient table 23. The carrier drive signal generating circuit 21 is formed of a field-programmable gate array (FPGA). The timing generator 22 generates a signal which gives timing of generating driving pulse signals. The transmit DSP 25 calculates amounts of time delays and weight values to be introduced into the transmit-receive channels 100 of the individual transducer elements 10 and writes these data in the coefficient table 23. The waveform memory 24 is a memory for temporarily storing waveform patterns having predefined amplitudes and other parameters based on which the driving pulse signals are generated. FIG. 3 shows an example of a memory map of the waveform memory 24. An address space of the waveform memory 24 is divided into 8 blocks in which particular kinds of driving codes (8 kinds in the example of FIG. 3) differing only in amplitude values of the individual driving pulse signals are stored. The transmit DSP 25 generates a control signal made up of binary values 0 and 1 for controlling how the level (High or Low state) of an uncoded pulse drive signal should change and writes this binary-coded control signal in the waveform memory 24. Also, the transmit DSP 25 calculates and updates data content of the coefficient table 23 every transmit cycle.

The carrier drive signal generating circuit 21 reads out weight values to be introduced into the individual transmit-receive channels 100 from the coefficient table 23 and sets upper addresses of the memory map stored in the waveform memory 24 from which driving codes representative of amplitude values corresponding to the weight values are to be read out. The individual transducer elements 10 are then weighted based on the weight values read from the set addresses. At the same time, the carrier drive signal generating circuit 21 performs offset control of lower addresses of the memory map of the waveform memory 24 based on delay data read out from the coefficient table 23, whereby the amounts of time delays to be introduced into the individual transducer elements 10 are coarsely defined (coarse delay control operation). Then, the carrier drive signal generating circuit 21 carries out a precision delay control operation in 1-bit steps on driving code data (made up of 16 bits defining 16 points in time) which have been weighted and coarsely delayed based on the weight values and the delay data read out from the waveform memory 24 and the coefficient table 23, respectively. Like the aforementioned coarse delay control operation, this precision delay control operation is performed based on the delay data (precision delay data) stored in the coefficient table 23. The driving code data weighted and delay-controlled for the individual transducer elements 10 is generated by performing a sequence of operations in the aforementioned manner.

The aforementioned delay control operation involves phase control operation performed based on phase data.

Further, the carrier drive signal generating circuit 21 reads out the control signal from the waveform memory 24 and, referring to the coefficient table 23, delivers the control signal together with the clock signal to each of the transmit-receive channels 100 through the interface 20.

Figure 4:
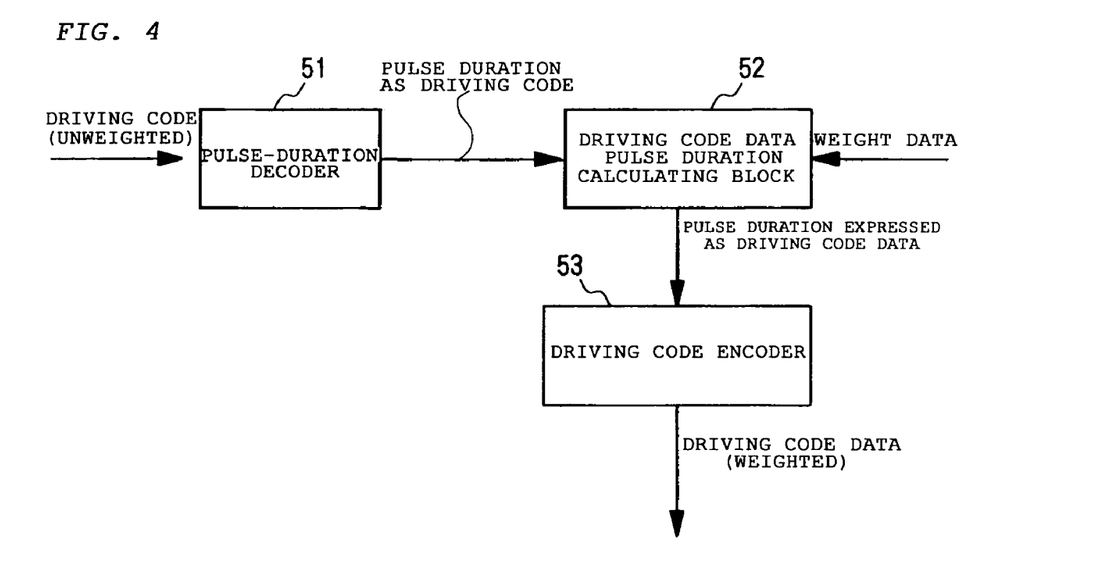
FIG. 4 is a block diagram of a weight control section of a carrier drive signal generating circuit.

While weight control operation described above utilizes a software-based process, similar weight control operation can be performed by using a hardware configuration shown in FIG. 4, for example. FIG. 4 is a block diagram of a principal circuit portion (weight control section) for performing such hardware-based weight control operation.

When an unweighted driving code is input into a pulse-duration decoder 51 as shown in FIG. 4, the pulse-duration decoder 51 calculates a pulse duration from the input driving code by using a counter and outputs the calculated pulse duration to a driving code data pulse duration calculating block 52. The driving code data pulse duration calculating block 52 calculates a weighted pulse duration expressed in the form of driving code data based on the input pulse duration and weight data read out from the coefficient table 23 and outputs weighted pulse duration data thus calculated to a driving code encoder 53. The driving code encoder 53 generates weighted driving code data from the input weighted pulse duration data by using a counter.

If such a hardware-based weight control section is provided, a waveform memory needs to simply store driving codes without any weight values. This makes it possible to reduce the amount of data to be stored in the waveform memory. In addition, the hardware configuration of FIG. 4 for aiding in the weight control operation serves to reduce amounts of software-based operations, that is, computational complexity or burdens imposed on DSP devices.

2. Receiving System

Referring again to FIG. 2, a buffer memory 27 is a memory for temporarily storing received echo data fed from the individual channels 100 through the interface 20. Designated by the numeral 28 is a programmable receiving beamformer including a receive DSP 29, a coefficient table 30 and a receiving beamforming processor 31. The receive DSP 29 calculates phases of echo signals received by the individual transducer elements 10 as well as weights to be assigned to the transducer elements 10 for each direction of the receiving beam and writes these parameters in the coefficient table 30. The receiving beamforming processor 31 synthesizes the echo signals received by the individual transducer elements 10 by applying the phases and weights written in the coefficient table 30 to obtain a synthesized received echo signal. The receiving beamforming processor 31 generates this synthesized received echo signal as time series data for each direction of the receiving beam and writes this data in a buffer memory 32. The receiving beamforming processor 31 is formed of an FPGA.

Designated by the numeral 33 is a programmable filter which includes a filtering DSP 34, a coefficient table 35 and a filtering processor 36. The filtering processor 36 is formed of an FPGA. The filtering DSP 34 calculates a filter coefficient for obtaining specific bandpass filter characteristics for each direction of the receiving beam and writes filter coefficients so obtained in the coefficient table 35. The filtering processor 36 performs mathematical operation as a finite impulse response (FIR) filter based on the filter coefficients stored in the coefficient table 35 and produces passband-corrected echo signals.

An envelope detector 40 detects an envelope of the passband-corrected echo signal derived from each direction of the receiving beam. Specifically, the envelope detector 40 detects the envelope by calculating the square root of the sum of the square of a real component of a time waveform and the square of an imaginary component of the time waveform.

An image processor 41 converts received echo signal intensities at individual distances in each direction of the receiving beam into image information and outputs it to a display 42. As a consequence, the display 42 presents a detected echo image of a specific search area on-screen.

An operating panel 39 is an input terminal for entering commands for setting the search area and other parameters as appropriate. A host central processing unit (CPU) 37 reads the commands entered through the operating panel 39 via an interface 38 and controls individual circuit elements described above accordingly.

3. Method of Generating Carrier Drive Signal and Driving Pulse Signal

FIGS. 5A, 5B, 5C, 5D, 5E, 5E' and 5F are a time chart showing a relationship among individual signals.

The transmit DSP 25 generates the clock signal (FIG. 5A), which is a pulse signal formed of rectangular-shaped pulses occurring at intervals of a specific pulse repetition period T, and the control signal (FIG. 5B) used for generating the reference signal, which is converted into the carrier drive signal through the aforementioned PDM process. The control signal is made up of the binary values 0 and 1 as stated earlier. This control signal, transmitted together with the clock signal, controls whether to change or hold a current level of the pulse drive signal. If the value of the control signal is "1," the level of the pulse drive signal is switched. If the value of the control signal is "0," on the other hand, the pulse drive signal maintains its current level.

The transmit DSP 25 determines an on-duty ratio, that is, the ratio of time during which the pulse drive signal is in a High state to total elapsed time, by using equation (1) below:

$$D(t) = \frac{1}{\pi}\cos^{-1}\{1 - A(t)^2\} \quad (1)$$

where D(t) is the on-duty ratio and A(t) is the amplitude of an envelope waveform. For example, D(t)=0 when A(t)=0, and D(t)=½ when A(t)=1.

The driver interface 11 generates pulse drive signals 1H (FIG. 5C) and 2H (FIG. 5D) based on the aforementioned clock signal and control signal. The driver interface 11 generates these pulse drive signals 1H, 2H in a manner that satisfies the following two conditions:

(1) Pulse trains of the pulse drive signals 1H and 2H contain alternately occurring pulses (High level portions), wherein neither of these pulses (the pulse drive signal 1H and 2H) continues to remain in the High state for an unduly long period.

(2) There must be an interval corresponding to at least one clock pulse repetition interval (period T) between any successive pulses of the pulse drive signal 1H and the pulse drive signal 2H.

Figure 5A:
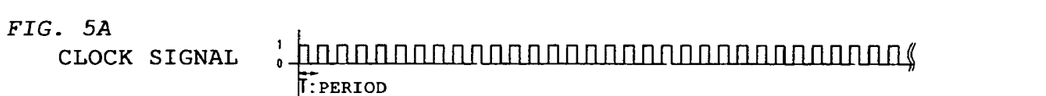
FIGS. 5A, 5B, 5C, 5D, 5E, 5E' and 5F are a time chart showing a relationship among various signals generated by and transferred among individual circuits shown in FIGS. 1 and 2.
Figure 5B:
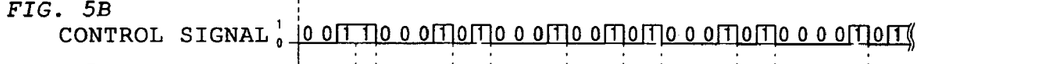
Figure 5C:
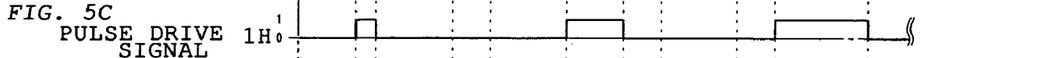
Figure 5D:
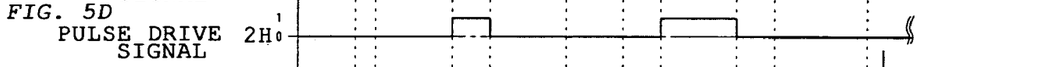
Figure 5E:
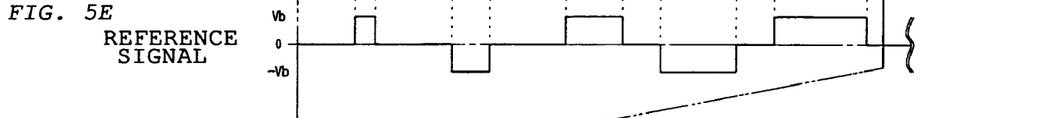

The pulse drive signals 1H and 2H generated by the driver interface 11 in this way are input into the driver circuit 12 to produce the aforementioned reference signal (FIGS. 5E and 5E').

Figure 6:
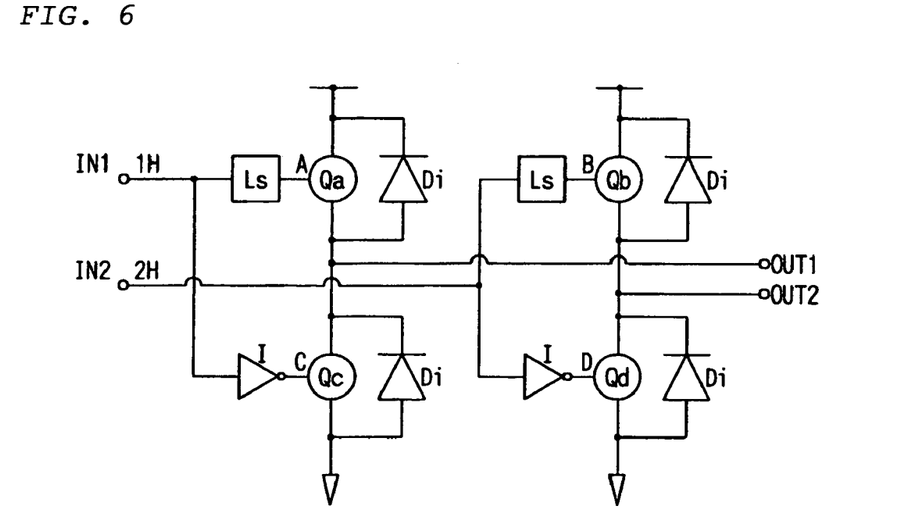
FIG. 6 is a circuit diagram showing the configuration of a driver circuit.
Figure 7:
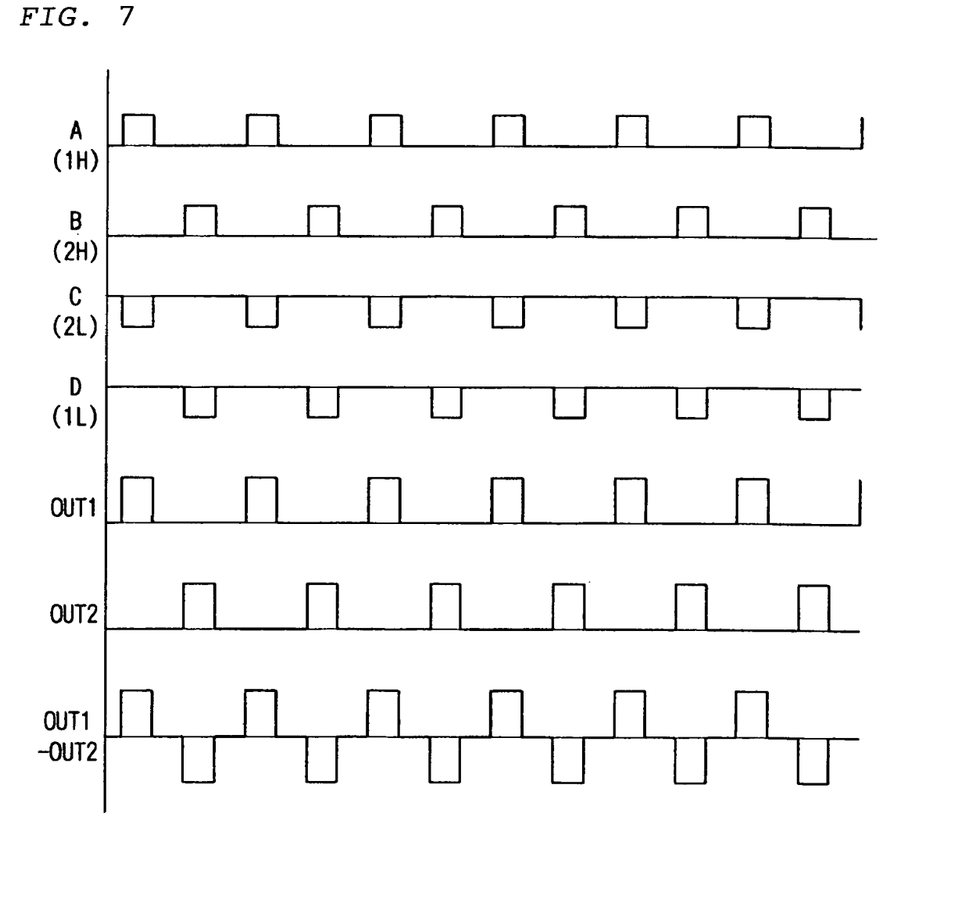
FIG. 7 is a diagram showing waveforms at various points of the driver circuit shown in FIG. 6.

FIG. 6 is a circuit diagram showing the configuration of the driver circuit 12, and FIG. 7 is a diagram showing waveforms at various points of the driver circuit 12 shown in FIG. 6.

Referring to FIG. 6, designated by Qa, Qb, Qc and Qd are metal-oxide-semiconductor (MOS) transistors, designated by Ls are level shifters for outputting a gate voltage of a specific level to gates of the MOS transistors Qa and Qb, and designated by I are inverters (NOT gates) for outputting a gate voltage to gates of the MOS transistors Qc and Qd. Also, designated by Di are diodes for absorbing a surge voltage occurring between a drain and a source of each of the MOS transistors Qa, Qb, Qc, Qd at their turn-off point.

When the pulse drive signals 1H and 2H are entered into the driver circuit 12 through input terminals IN1 and IN2, respectively, voltage signals (pulses) shown in FIG. 7 occur at points A, B, C and D. When the signals at these points A, B, C, D are at a High level, the corresponding MOS transistors Qa, Qb, Qc, Qd to which the High level is supplied as the gate voltage conduct. When the signals at these points A, B, C, D are at a Low level, the corresponding MOS transistors Qa, Qb, Qc, Qd turn off. Thus, the driver circuit 12 outputs voltage signals shown in FIG. 7 from output terminals OUT1 and OUT2. A difference between these two output voltages (expressed as OUT1−OUT2 for the sake of explanation) is used as the reference signal which is shown in FIG. 5E.

If the on-duty ratios of the pulse drive signals 1H, 2H entered through the respective input terminals IN1, IN2 are increased, on-time of the transistors Qa, Qb increases. In other words, positive and negative voltage periods of the reference signal, or a total period of time during which the reference signal is other than 0 volts, are prolonged as a result of an increase in the on-duty ratios.

Figure 5F:
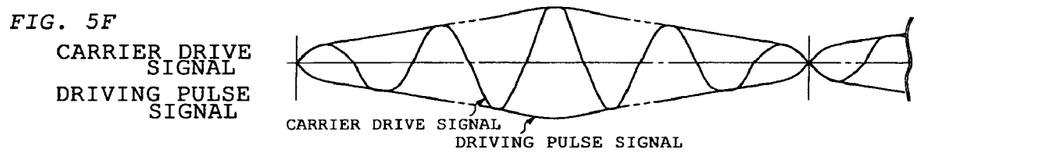

As a pulse-duration-modulated reference signal is passed through the transmit-side matching circuit 19a during its positive and negative voltage periods, there is generated a driving pulse signal formed of an analog carrier drive signal of which envelope is controllably shaped as illustrated in FIG. 5F.

Figure 8:
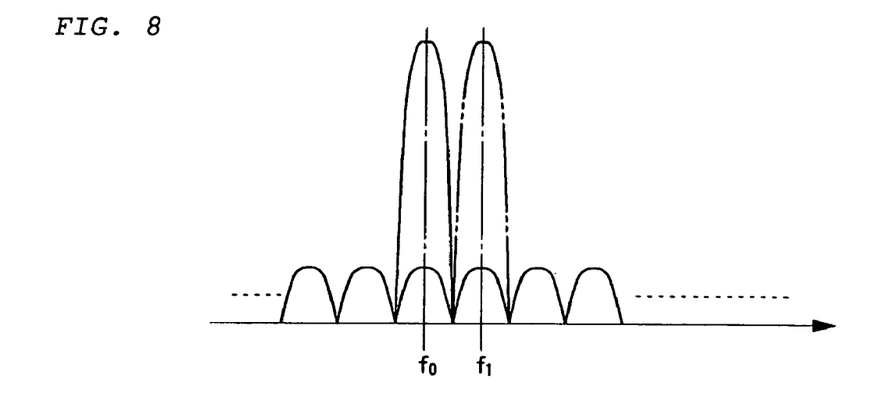
FIG. 8 is a diagram showing frequency components of ultrasonic signals transmitted and received by sonars installed on two nearby ships.

In this embodiment, each of the transducer elements 10 is driven by the driving pulse signal thus generated, in which each successive driving pulse is shaped into a curved waveform having a gradually rising leading-edge portion and a gradually falling trailing-edge portion as shown in FIGS. 5F and 18A. It is possible to suppress or reduce undesired frequency components radiated from a transducer as shown in FIG. 18B by driving the individual transducer elements 10 with driving pulses having gradually sloped rising and falling portions. Therefore, even when a transmitting frequency $f_o$ of a scanning sonar installed on own ship is close to a transmitting frequency $f_1$ of a scanning sonar installed on another ship near own ship as shown in FIG. 8, it is possible to suppress influence of undesired frequency components of an ultrasonic signal transmitted from the scanning sonar on one ship on an ultrasonic signal received by the scanning sonar on the other ship. In other words, it is possible to prevent such a phenomenon that the undesired frequency components of the ultrasonic signal transmitted from the scanning sonar on one ship are received as target echoes by the scanning sonar on the other ship. This helps prevent reception of false target echoes from nearby ships and ensure exact detection of true target echoes.

The foregoing embodiment also serves to suppress influence of spurious components of frequency response (transfer function) of the transmit-side matching circuit 19a inserted in a preceding stage of the transducer element 10. In other words, the aforementioned configuration of the present embodiment makes it possible to prevent interference caused by the spurious components of the frequency response of the transmit-side matching circuit 19a, because frequency components of the driving pulse signal of FIG. 18A other than its center frequency are much suppressed as shown in FIG. 18B.

As a result, the occurrence of ringing is suppressed and the scanning sonar can obtain precise target echoes including echoes from nearby targets, such as bottom echoes in shallow areas.

The carrier drive signal generating circuit 21 controls the amplitude of the carrier drive signal supplied to each transducer element 10 together with the amount of time delay based on weight information fed from the transmit DSP 25 in such a manner that the carrier drive signals supplied to the individual transducer elements 10 have prescribed amplitudes. Since the amplitudes of the carrier drive signals are varied, or weighted, for the individual transducer elements 10 in this way, it is possible to control directivity of the transmitting beam formed by the entirety of the transducer elements 10 arranged on the surface of the transducer.

It is therefore possible to give high directivity to an ultrasonic transmitting signal emitted from the transducer and suppress the occurrence of side lobes at the same time. This enables the scanning sonar to obtain a distinct single echo from a single target and thereby achieve successful detection of target echoes.

While the invention has so far been described with reference to a single-frequency system in which the transducer emits the ultrasonic transmitting signal on a single frequency, the aforementioned arrangement of the invention is applicable to a system designed to transmit on multiple frequencies as well.

Here, a scanning sonar capable of emitting ultrasonic transmitting signals at two different frequencies is taken as an example. In such a dual-frequency scanning sonar, the ultrasonic transmitting signal of a first frequency is used for horizontal scan mode, in which areas around a transducer are horizontally scanned, while the ultrasonic transmitting signal of a second frequency is used for vertical scan mode, in which a vertical cross section of underwater situation in a particular azimuth is vertically scanned.

Figure 9A:
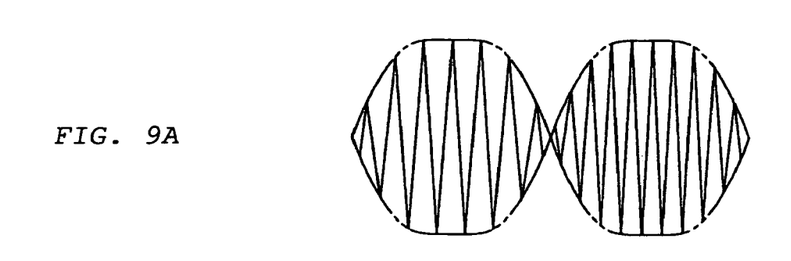
FIGS. 9A and 9B are diagrams showing waveforms of driving pulse signals.

In one form of the invention, the dual-frequency scanning sonar alternately radiates the ultrasonic transmitting signal of the first frequency for the horizontal scan mode and the ultrasonic transmitting signal of the second frequency for the vertical scan mode at successive pulses of the driving pulse signal as depicted in FIG. 9A. The scanning sonar thus structured can scan in both horizontal and vertical directions substantially at the same time.

Figure 10:
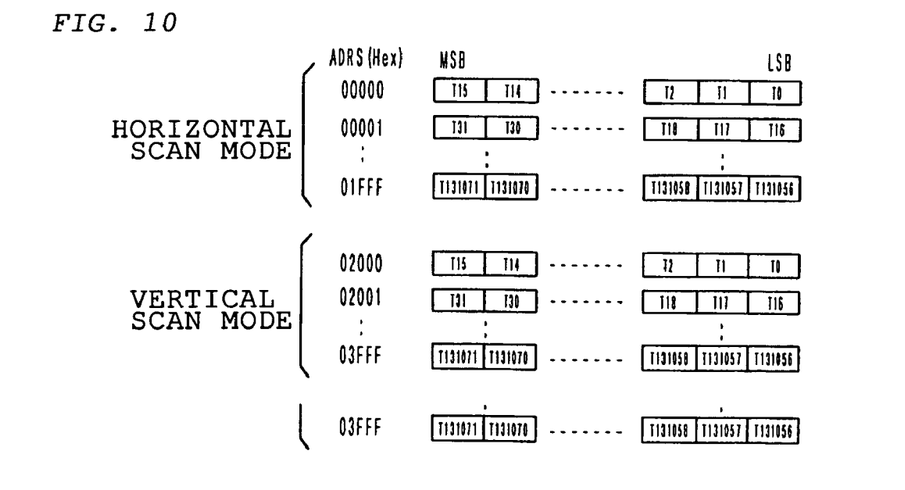
FIG. 10 is a conceptual diagram showing another example of data content of a memory map stored in a waveform memory.

If the memory map of FIG. 3 is rewritten as shown in FIG. 10, the aforementioned structure of the dual-frequency scanning sonar makes it possible to generate driving code data suited to the two frequencies for the alternating scan modes defining controlled amounts of time delays for the individual channels 100.

Figure 9B:
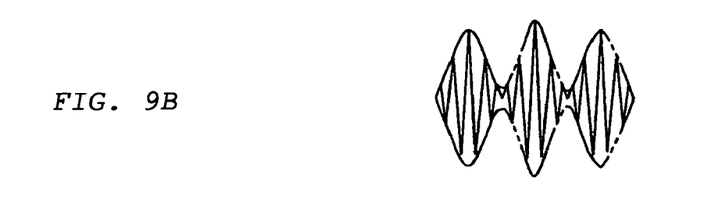
Figure 11A:
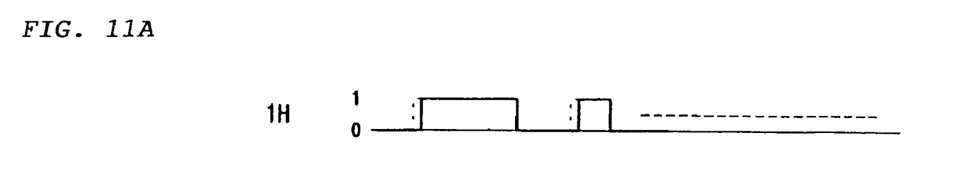
FIGS. 11A, 11B, 11C and 11D are diagrams showing how a reference signal and a carrier drive signal are produced by combining pulse drive signals of two different frequencies.
Figure 11B:
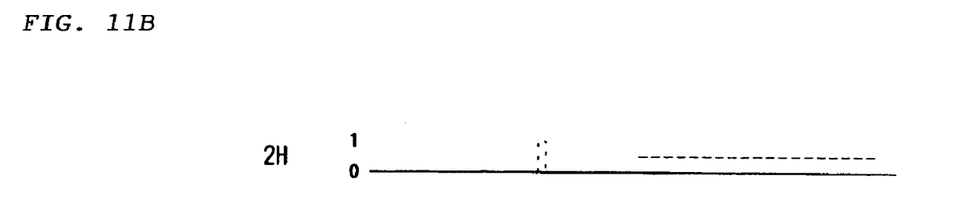

In another form of the invention, the dual-frequency scanning sonar radiates ultrasonic transmitting signals (carrier drive signals) of the two frequencies in a combined form as shown in FIG. 9B. To generate a combined-frequency waveform as shown in FIG. 9B, an envelope of a single driving pulse should have multiple peaks and valleys, not crossing a zero level at the valleys. In this scanning sonar, the control signal is produced on condition that there is made an interval corresponding to at least twice the clock pulse repetition interval (2T) between any successive pulses of the aforementioned pulse drive signals 1H and 2H, and there is provided an additional circuit in the aforementioned driver interface 11 for deleting the leading edge of one clock pulse. With this circuit configuration, it is possible to generate pulse drive signals 1H and 2H as shown in FIGS. 11A and 11B, in which broken lines represent original waveforms before the leading edge of one clock pulse is deleted, and solid lines represent the combined-frequency waveform produced by deleting the leading edge of one clock pulse.

Figure 11C:
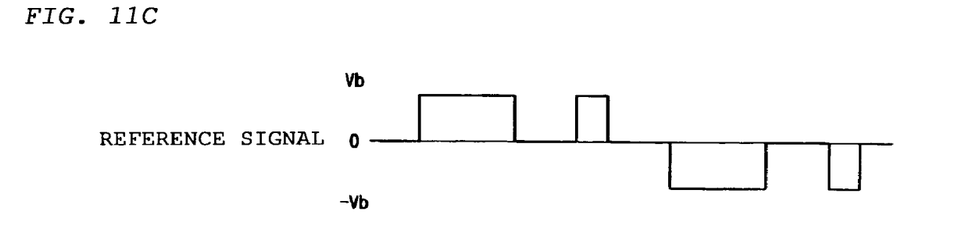
Figure 11D:
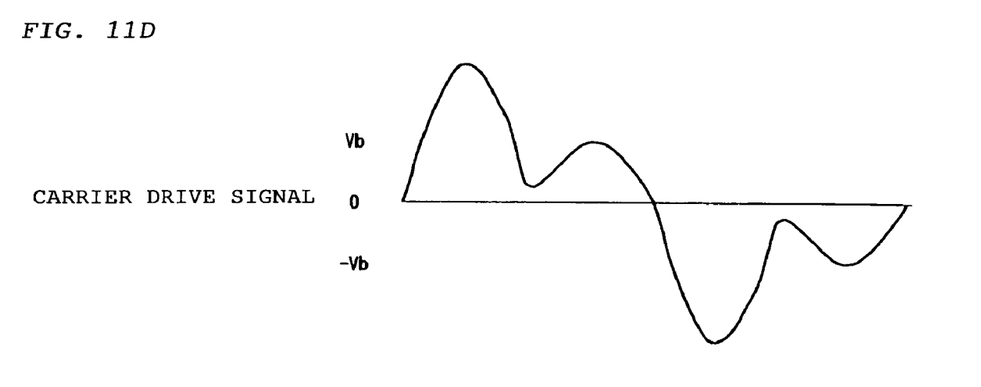

A reference signal and a carrier drive signal shown in FIGS. 11C and 11D, respectively, are generated from these pulse drive signals 1H, 2H. Then, a driving pulse signal combining the aforementioned two frequencies is produced with a controllably shaped envelope.

Figure 12A:
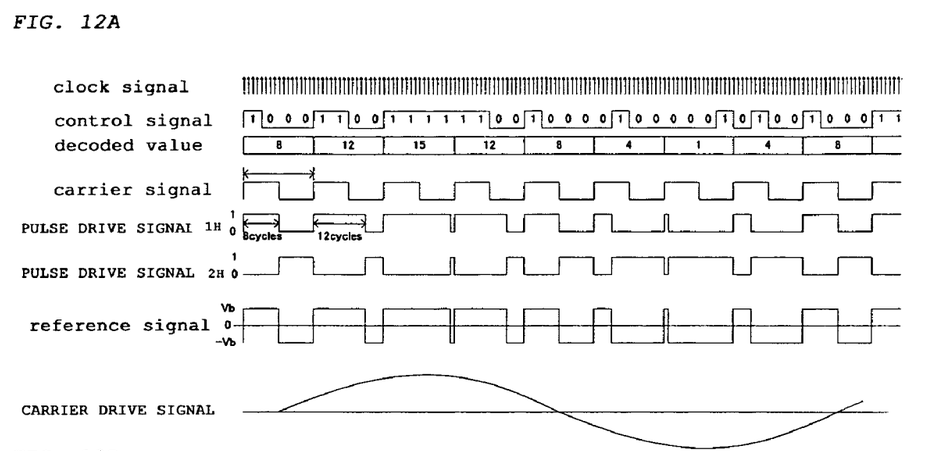
FIGS. 12A and 12B are time charts showing a relationship among various signals generated by the individual circuits shown in FIGS. 1 and 2 in a varied form of the embodiment.
Figure 12B:
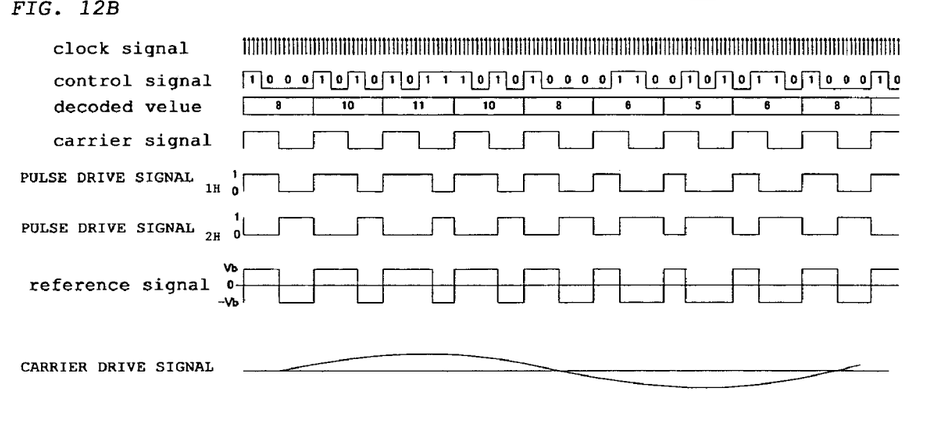

While the reference signal is pulse-duration-modulated such that the amplitude of the carrier drive signal corresponds to the length (duration) of each single pulse of the reference signal in the foregoing embodiment as depicted in FIGS. 5A through 5F, it is possible to use an alternative PDM method which is shown in FIGS. 12A and 12B.

FIGS. 12A and 12B are time charts showing a relationship among a clock signal, a control signal, decoded values of the control signal, a carrier signal, pulse drive signals 1H and 2H, a reference signal and a carrier drive signal. The content of the control signal of FIG. 12A differs from that of FIG. 12B, so that the amplitude of the carrier drive signal of FIG. 12A differs from that of FIG. 12B correspondingly.

The pulse drive signals 1H, 2H are generated based on the clock signal formed of pulses occurring at intervals of a specific pulse repetition period and the control signal made up of specific binary values 0 and 1 as illustrated in FIGS. 12A and 12B. Pulse durations of the pulse drive signals 1H, 2H, or the length (duration) of each "1" (High) state period of the pulse drive signals 1H, 2H, are controlled by according to the decoded values of the control signal in each successive fixed pulse repetition period of the carrier signal which includes a specified number of pulses of the clock signal.

Durations of Vb and –Vb levels of the reference signal are determined by controlling the pulse drive signals 1H, 2H as described above. The reference signal is pulse-duration-modulated in such a way that portions of the reference signal where the Vb level lasts for a relatively long period correspond to portions of the carrier drive signal where it takes a positive level of great magnitude, portions of the reference signal where the –Vb level lasts for a relatively long period correspond to portions of the carrier drive signal where it takes a negative level of great magnitude, and portions of the reference signal where the Vb and –Vb levels last for approximately the same period correspond to portions of the carrier drive signal where its level is 0.

FIG. 12A represents a case where the decoded values of the control signal are greatly varied over successive pulse repetition periods of the carrier signal. In contrast, FIG. 12B represents a case where the decoded values of the control signal are not varied so much over successive pulse repetition periods of the carrier signal. It is possible to control the amplitude of the carrier drive signal by the aforementioned PDM method based on the control signal generated as described above.

What is claimed is:

1. An ultrasonic transmitter comprising:
a transducer having a plurality of transducer elements, each transducer element being associated with a separate channel, arranged on a surface of the transducer; and
a transmitting beamformer which provides commands to generate carrier drive signals for forming an ultrasonic transmitting beam by driving the multiple transducer elements with the carrier drive signals;
wherein said transmitting beamformer generates a control signal, for each channel, for controlling pulse durations of a reference signal to generate a carrier drive signal, further wherein the control signal is based upon at least one channel dependent parameter.

2. The ultrasonic transmitter according to claim 1, wherein the transmitting beamformer includes:
a control signal generator for generating a rectangular pulse signal of a specific frequency and the control signal for controlling the waveform of a reference signal on which a pulse-duration modulation process is performed; and
a carrier drive signal generator for generating the carrier drive signal by pulse-duration-modulating the reference signal based on the rectangular pulse signal and the control signal.

3. The ultrasonic transmitter according to claim 2, wherein the control signal is a signal made up of binary values 0 and 1.

4. The ultrasonic transmitter according to one of claims 1, 2 or 3, wherein the transmitting beamformer controls directivity of the transmitting beam by varying the amplitude of the carrier drive signals for driving each of the multiple transducer elements based on weight data previously stored in the transmitting beamformer.

5. The ultrasonic transmitter according to one of claim 1 through 3, wherein the transmitting beamformer varies the amount of time delay introduced into the carrier drive signal for driving each of the multiple transducer elements based on time delay data previously stored in the transmitting beamformer.

6. The ultrasonic transmitter according to claim 5, wherein the time delay data includes coarse time delay data and precision time delay data, and the transmitting beamformer perform precision delay control operation based on the precision time delay data after performing coarse delay control operation based on the coarse time delay data.

7. The ultrasonic transmitter according to one of claims 1 through 3, wherein the carrier drive signals are produced having different frequencies.

8. An ultrasonic transceiver comprising: the ultrasonic transmitter according to one of claims 1 through 3; and
a receiving beamformer for forming an ultrasonic receiving beam by controlling signals produced from ultrasonic waves received by the multiple transducer elements of the transducer.

9. A sonar apparatus comprising:
the ultrasonic transceiver according to claim 8; and
a device for controlling the receiving beamformer to scan successive sounding directions within the transmitting beam and pick up echo signals from the individual sounding directions and for displaying detected echo data obtained from the echo signals.

10. The ultrasonic transmitter according to claim 1, wherein the parameter includes time delay or weight value.

11. The ultrasonic transmitter according to one of claims 1, 2, or 3, wherein the transmitting beamformer controls an envelope of the carrier drive signal by varying the amplitude of the carrier drive signal based on envelope data stored in the transmitting beamformer.

* * * * *